United States Patent Office 3,367,478
Patented Feb. 6, 1968

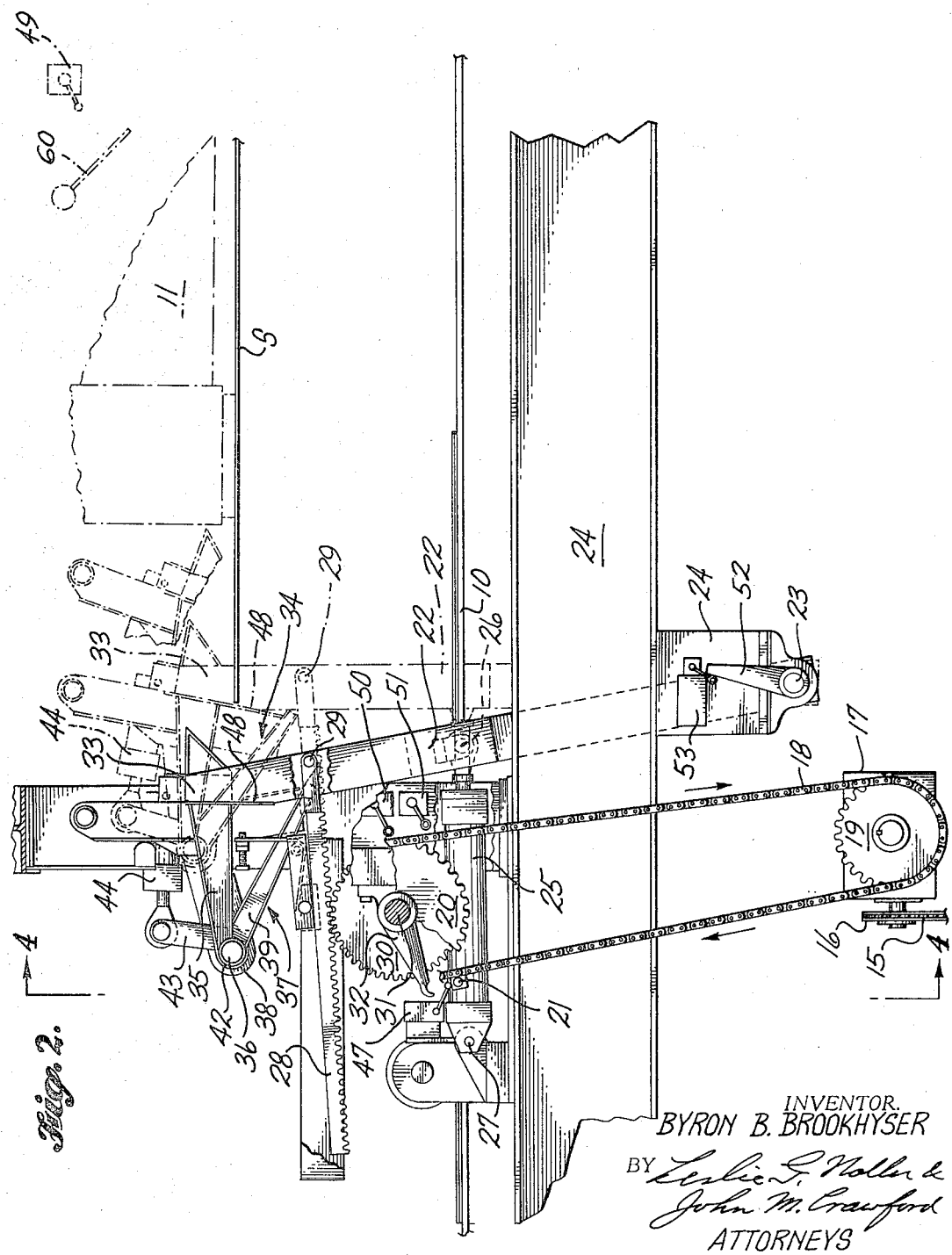

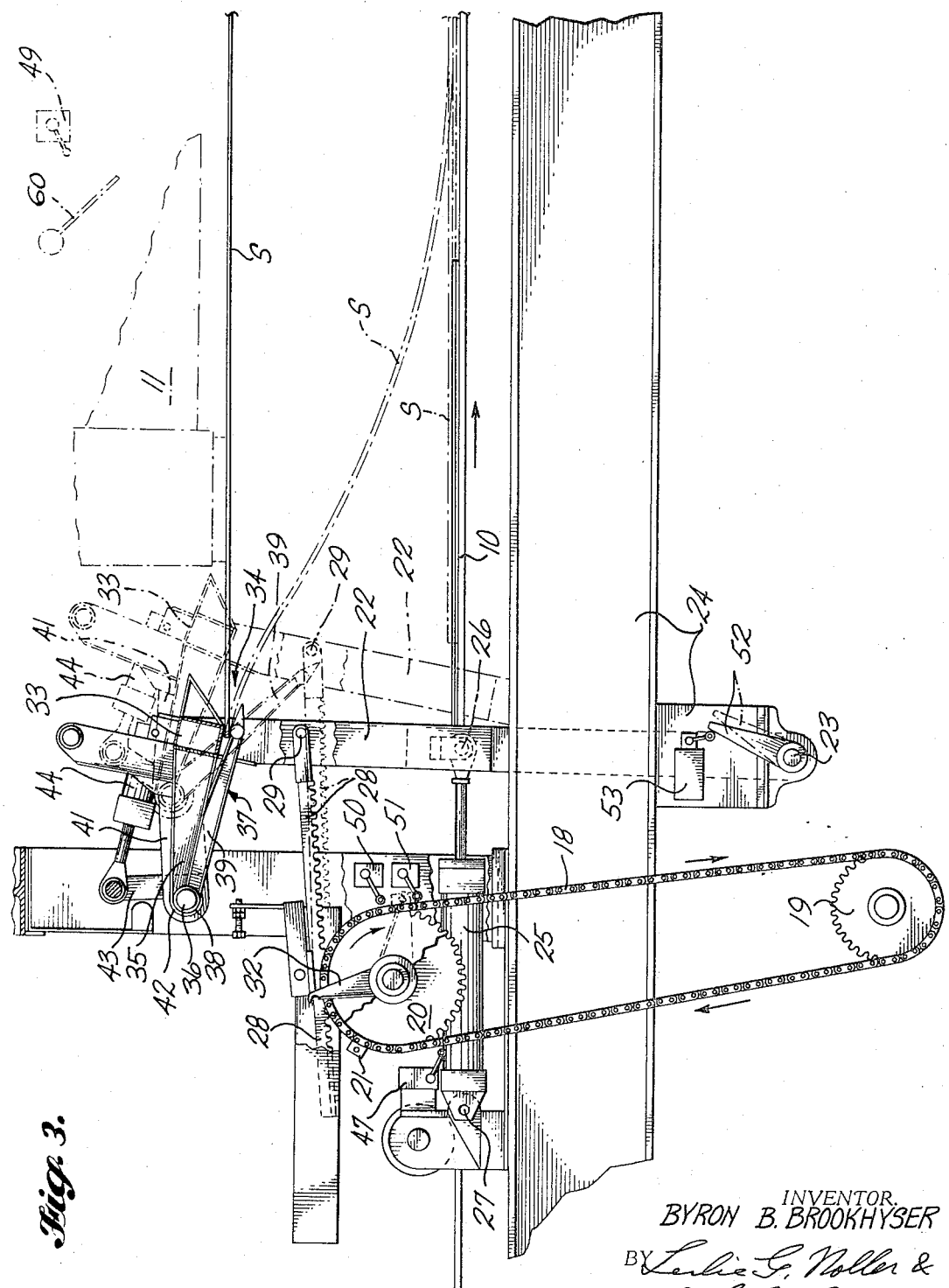

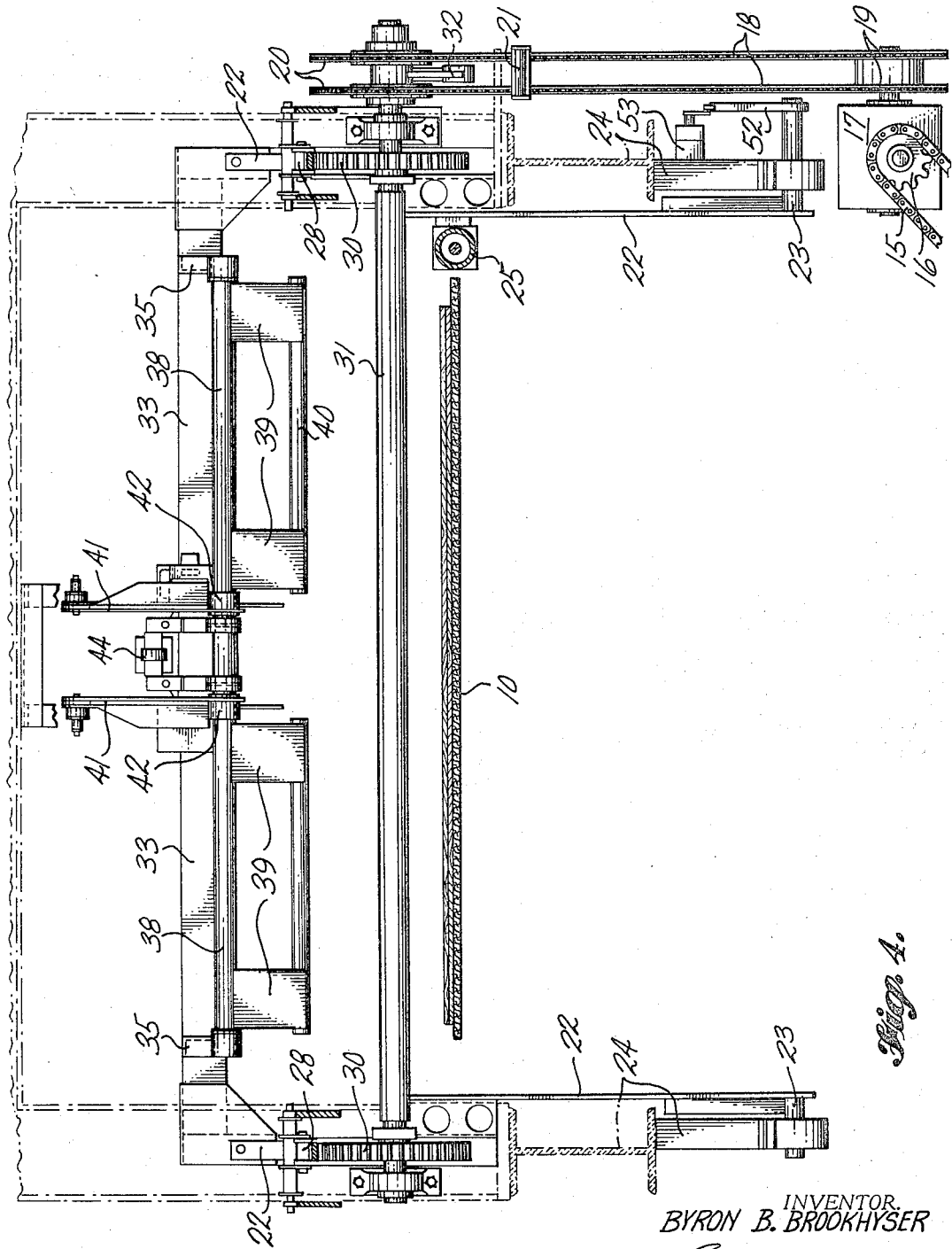

3,367,478
SHEET POSITIONER
Byron B. Brookhyser, Milton, Wash., assignor to Weyerhaeuser Company, Tacoma, Wash., a corporation of Washington
Filed Aug. 26, 1966, Ser. No. 575,933
15 Claims. (Cl. 198—35)

ABSTRACT OF THE DISCLOSURE

An apparatus for placing a sheet on a predetermined position on a conveyor. A vacuum transfer apparatus holds the sheet over the conveyor. An oscillating clamp pivots forwardly in the direction of conveyor travel, detects and clamps the sheet. The overhead vacuum is released. The clamp pivots rearwardly until it is aligned with the predetermined position on the conveyor and then pivots forwardly at the speed of the conveyor. At a predetermined point the clamp releases the sheet. The clamp returns to its original position.

---

This invention relates to an apparatus for positioning a sheet on a conveyor and specifically relates to an apparatus for positioning wood veneer on a conveyor.

In the manufacture of plywood, the various elements of the plywood lamina are placed on a conveyor as the conveyor passes by stations where the elements are stored. Thus, in the manufacture of three-ply plywood, a face sheet is placed on the conveyor at a first station, cross core members are placed on the face sheet at a second station, and a second face sheet is placed on the cross core stock at a third station. In the manufacture of five-ply plywood, a face sheet is placed on the conveyor at a first station, cross core members are placed on the face sheet at the second station, a center core sheet is placed on the cross core members at a third station, another group of cross core members are placed on the center core sheet at a fourth station, and a second face sheet is placed on the cross core members at a fifth station. It is necessary that the face sheets and the center core sheet be in alignment in order to produce economically panels that meet quality standards. If the cross core members are assembled as a unitary element, it is also necessary that they be in alignment with the other sheets.

It is an object of this invention to provide an apparatus which will place a sheet on the conveyor in its proper position and in alignment with other sheets.

This and other objects of the invention will become apparent upon reading the following specification in conjunction with the attached drawings.

FIGURE 2 is a side elevational view of the apparatus in a first position with sections cut away to show details of construction, and with sections in skeletal outline to show the apparatus in a second position.

FIGURE 3 is a side elevational view of the apparatus in a third position with sections cut away to show details of construction, and with sections shown in skeletal outline to show the apparatus in a fourth position.

FIGURE 4 is a front plan view, partially in cross section, taken along line 4—4 of FIGURE 2.

Figure 1:
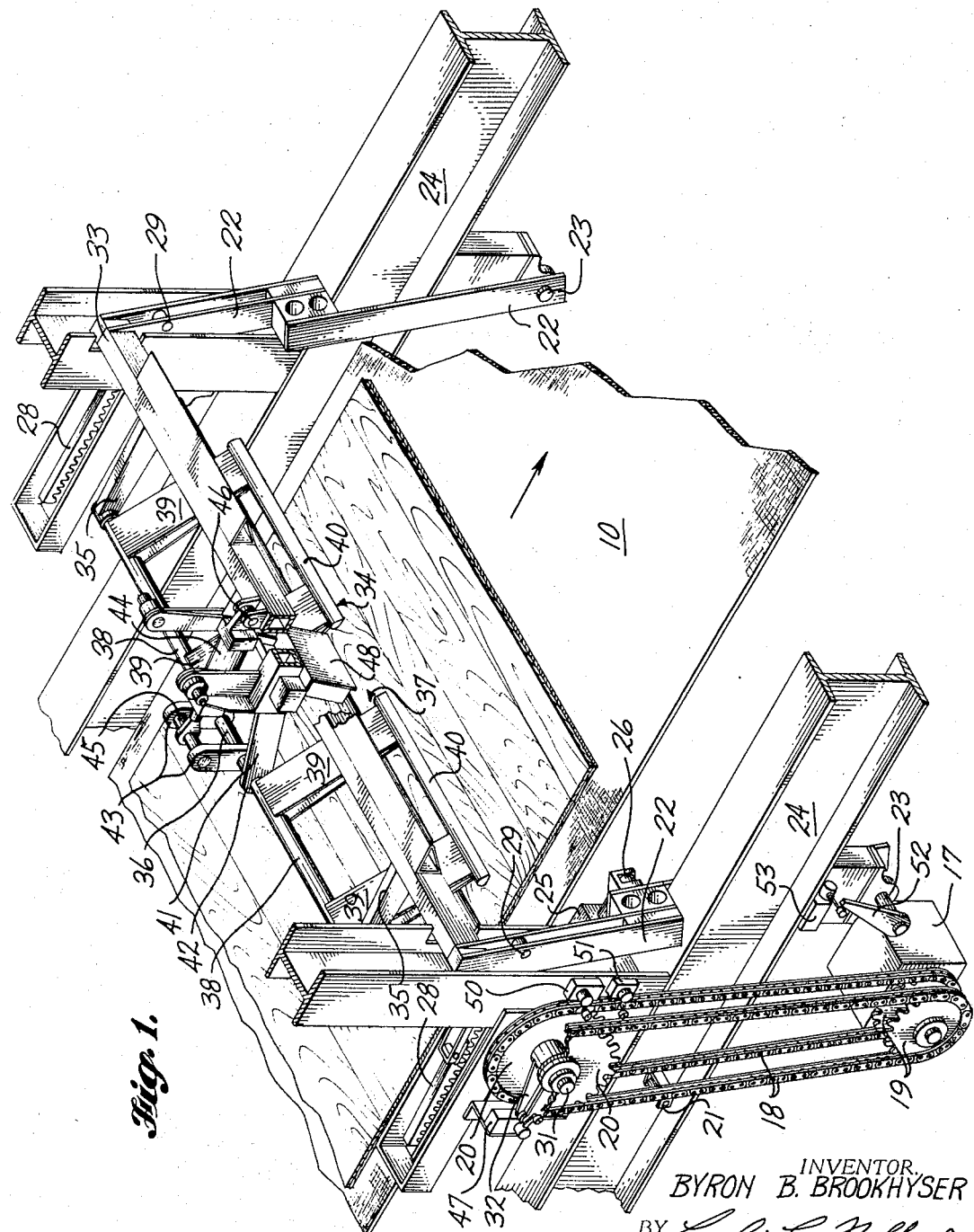
FIGURE 1 is an isometric view of the apparatus.

Basically the apparatus places sheets S in a predetermined position on the conveyor 10. These sheets are stored adjacent to the conveyor and are picked up and carried in a position over the conveyor by an overhead vacuum transfer apparatus 11 (FIGURES 2–3). The overhead vacuum transfer apparatus holds the sheet over the conveyor until the positioner grasps the sheet. After this action, the vacuum on the overhead transfer apparatus is released and the transfer apparatus returns to a position over the sheet storage area to pick up another sheet. When the sheet being held by the positioner is aligned with a sheet position on the conveyor, the positioner releases the sheet so that it will fall into position on the conveyor. The sheet positioner returns to its first position and the overhead transfer apparatus carries another sheet into position over the conveyor to repeat the cycle.

The sheet positioner is driven by the conveyor drive shaft. A drive chain 15 (FIGURE 2) is trained around a sprocket on the conveyor drive shaft (not shown) and around a sprocket 16 on the speed reducer 17. A pair of timing chains 18 are trained around a pair of output drive sprockets 19 on the speed reducer 17 and around a pair of sheet positioner timing sprockets 20. A lug 21 is attached to the timing chains 18. The speed of the timing chains 18 is such that the lug 21 makes one revolution per sheet position on the conveyor 10.

The apparatus has a pair of rocker arms 22 pivotally mounted at 23 to the frame 24 of the conveyor 10. A cylinder 25 is pivotally connected to one of the arms 22 at 26, and to the conveyor frame 24 at 27. A rack 28 is pivotally mounted to each of the arms 22 at 29. Each of the racks 28 engages a pinion gear 30. Both pinion gears are gears 30 are fixedly mounted on the shaft 31. The timing sprockets 20 are rotatably mounted on the shaft 31, and the saddle 32 is fixedly mounted on the shaft 31.

The upper ends of the arms 22 are connected by a cross bar 33 which forms the upper jaw of the sheet positioner clamp 34. A pair of brackets 35 are fixedly mounted on the cross bar 33 and extend rearwardly of it. A tubular shaft 36 connects the rearward ends of the brackets 35. The lower jaw member 37 is pivotally mounted on the shaft 36 by tubular members 38. A plurality of arms 39 are affixed to the members 38 and extend forwardly of the members 38. The clamps 40 of the lower jaw member 37 are mounted on the forward ends of the arms 39. The lower jaw member 37 is also braced by a pair of arms 41 which are fixedly attached to cross bar 33. Each of the arms 41 has an aperture 42 in which a tubular member 38 is pivotally mounted. Each of the members 38 has an upright arm 43 that is pivotally connected to a cylinder 44 by shaft 45. The cylinder 44 is pivotally connected to cross bar 33 at 46. The cylinder opens and closes the clamp 34 by raising and lowering the lower jaw member 37.

The cylinders 25 and 44 may either be air operated or hydraulically operated. The operating cycle of each type is slightly different.

The operating cycle will be explained by reference to FIGURE 2. In the position shown in bold outline, the sheet S is held over the conveyor 10 by the overhead vacuum transfer apparatus 11. The lug 21 on the timing chains 18 is about to contact the limit switch 47. The continued movement of the lug 21 actuates the limit switch 47 which operates the valve on the air cylinder 25 allowing air to enter the blind end and exit from the rod end of the cylinder. The cylinder pivots the arms 22 forwardly into the position shown in skeletal outline in FIGURE 2.

The forward pivoting action of the arms 22 also carries the racks 28 forwardly, pivoting the pinion gears 30 and the saddle 32 into the position shown in bold outline in FIGURE 3.

This forward movement of the arms 22 also causes the limit switch 48 between the jaws of the clamp 34 to contact the edge of the sheet S. This actuates the limit switch 48 causing two things to happen. The valves to the air cylinder 44 are opened, allowing air to enter the blind end and exit from the rod end of the cylinder, causing the upright arms 43 to pivot rearwardly and the lower jaw member 37 to move upwardly and clamp the edge of the sheet S between clamps 33 and 40. As the clamping action takes place, the damper 60 on the overhead vacuum transfer apparatus 11, which operates less quickly, releases the vacuum and causes the sheet to drop into the position shown in skeletal outline in FIGURE 3 after being clamped.

When the damper 60 has opened, a limit switch 49 on the damper signals the valve to cylinder 25 to admit air into the rod end and exhaust air from the blind end, causing the arms 22 to reverse. This also reverses the movement of the racks 28, the gears 30 and the saddle 32. This action pulls the sheet S rearwardly until it is in register with its position on the conveyor.

At this moment, the saddle 32 contacts the lug 21. The forward movement of the lug 21 again reverses the direction of the saddle 32, the pinion gears 30 and the racks 28, causing the arms 22 to again pivot forwardly and carry the sheet S forwardly in synchronism with its position on the conveyor as shown in FIGURE 3.

Further travel of the timing lug 21 brings it into contact with the limit switch 50. This switch reverses the position of the valves on the air cylinder 44 to allow air to enter the rod end and exit from the blind end of the cylinder, opening the clamp 34 and dropping the sheet S onto a sheet position on the conveyor 10. The continued travel of the lug 21 frees it from the saddle 32, and allows the air cylinder 25, which is still operating in a reverse direction, to pivot the arms 22 rearwardly and return the device to its initial position.

The operation is slightly different if a hydraulic cylinder is used. Turning again to FIGURE 2, the lug 21 actuates the limit switch 47 which operates the valve on the cylinder 25 allowing fluid to enter the blind end and exit from the rod end of the cylinder. Again, the cylinder pivots the arms 22 forwardly into the position shown in skeletal outline in FIGURE 2, until the limit switch 48 contacts the edge of sheet S. This again causes the cylinder 44 to close the jaw 34, grasping the sheet, and the damper 60 on the overhead vacuum transfer apparatus to open, releasing the sheet.

The limit switch 49, actuated by the damper 60, causes the valve on cylinder 25 to vent. The flow from the rod end is through a fixed resistance in the pipe which places a breaking force on the forward travel of the arms 22, stopping them in short distance.

Again, the forward pivoting action of the arms 22 has carried the racks 28 forwardly, pivoting the pinion gears 30 and the saddle 32 into the position shown in bold outline in FIGURE 3. The positioning device remains in this position until the further travel of the lug 21 causes the lug to contact the saddle 32. At this time the sheet S is in register with its sheet position on the conveyor. The lug 21 continues to travel forwardly, pivoting the saddle and the attached pinion gears 30 forwardly. This action pushes the rack 28 and the attached rocker arms 22 forwardly into the position shown in skeletal outline in FIGURE 3. This action causes the sheet S to move forwardly in synchronism with its sheet position on the conveyor.

Further travel of the timing lug 21 brings it into contact with the limit switch 50, which again causes the clamp 34 to open dropping the sheet S onto its sheet position on the conveyor 10.

The timing lug continues to travel until it passes from the saddle 32. Following this it contacts the limit switch 51. This actuates the valve on cylinder 25 causing fluid to enter the rod end of the cylinder. This returns the arms 22 and the associated rack and pinion gears to their initial position.

In each of the devices, the arm 52 fixedly mounted to the arm 22 actuates the limit switch 53 which operates the overhead vacuum transfer mechanism 11 causing it to carry a veneer sheet into position over the conveyor after the positioning device has reached its initial position. The cycle is ready to repeat.

While detailed examples of certain embodiments of the invention have been described herein, it is understood that many changes and modifications may be made in the above apparatus without departing from the spirit of the invention.

What is claimed is:

1. Sheet positioning means comprising
a conveyor,
first means for moving said conveyor,
a sheet supply station,
second means for transferring a sheet from said station and holding said sheet over said conveeyor,
third means for sensing a sheet,
fourth means over said conveyor actuable by said third means for grasping said sheet,
fifth means responsive to a position of said conveyor for actuating said fourth means to release said sheet.

2. The sheet positioning means of claim 1 in which said fifth means is driven by said first means in timed relationship with the speed of said conveyor, said fifth means comprising a switch which operates said fourth means.

3. The apparatus of claim 2 in which said fourth means comprises a clamp and means for opening and closing said clamp.

4. The apparatus of claim 1 in which said second means is actuable by said third means to release said sheet after said fourth means has grasped said sheet.

5. The apparatus of claim 4 in which said second means comprises an overhead vacuum transfer apparatus and a damper for releasing the vacuum in said apparatus.

6. The apparatus of claim 4 further comprising a sixth means for moving said third and fourth means forwardly to grasp said sheet.

7. The apparatus of claim 6 in which said sixth means includes a timing means driven in timed relationship with the speed of said conveyor, a seventh means for holding said third and fourth means, and an eighth means operable by said timing means for moving said seventh means forwardly.

8. The apparatus of claim 7 in which said eighth means is also operable by said third means to stop its forward movement.

9. The apparatus of claim 7 in which said fourth means comprises a clamp and means for opening and closing said clamp.

10. The apparatus of claim 6 further comprising a ninth means for moving said third and fourth means forwardly to drop said sheet onto said conveyer.

11. The apparatus of claim 10 in which said sixth means includes a timing means driven in timed relationship with the speed of said conveyor, a seventh means for holding said third and fourth means, and an eighth means operable by said timing means for moving said seventh means forwardly, and said ninth means includes said timing means and said seventh means and a tenth means for moving said seventh means forwardly.

12. The apparatus of claim 11 in which said seventh means comprises a moveable carriage, said eighth means has a forward movement that is not related to the speed of the conveyor and said tenth means has a forward movement that is related to the speed of the conveyor.

13. The apparatus of claim 11 in which said eighth means is operable by said third means to stop its forward travel and said tenth means is operable by said timing means to stop its forward travel.

14. The apparatus of claim 10 further comprising an eleventh means for returning said third and fourth means to their original position.

15. The apparatus of claim 14 in which said second means is also actuable by said third means to move to a second position to obtain another sheet and there is a twelfth means actuable upon the return of the third and fourth means to the original position for returning said second means to a position over the conveyor.

References Cited

UNITED STATES PATENTS 2,626,038   1/1953   Smith _____ 198—35

RICHARD E. AEGERTER, *Primary Examiner.*